June 14, 1938.  R. D. HULSLANDER  2,120,558
METHOD AND APPARATUS FOR LOOSENING DEFORMABLE ARTICLES FROM MOLDS
Filed April 29, 1936   4 Sheets-Sheet 1

INVENTOR
Raymond D. Hulslander
BY Albert L. Ely
ATTORNEY

June 14, 1938.    R. D. HULSLANDER    2,120,558
METHOD AND APPARATUS FOR LOOSENING DEFORMABLE ARTICLES FROM MOLDS
Filed April 29, 1936    4 Sheets-Sheet 4

INVENTOR
Raymond D. Hulslander
BY Albert L. Ely
ATTORNEY

Patented June 14, 1938

2,120,558

UNITED STATES PATENT OFFICE 2,120,558

METHOD AND APPARATUS FOR LOOSENING DEFORMABLE ARTICLES FROM MOLDS

Raymond D. Hulslander, Akron, Ohio, assignor to The Firestone Tire & Rubber Company, Akron, Ohio, a corporation of Ohio Application April 29, 1936, Serial No. 76,954

9 Claims. (Cl. 18—2)

This invention relates to methods and apparatus for loosening deformable articles from molds, and more especially it relates to procedure and apparatus for effecting a breaking of the adhesion between a vulcanized rubber article and the mold in which it is vulcanized, throughout a portion, at least, of their contacting surfaces, whereby the article is easily stripped from the mold by stripping mechanism that subsequently engages it.

The invention is of primary utility in the rubber industry for the purpose of loosening vulcanized pneumatic tire casings from the lower section of the mold in which it was vulcanized. In situations of the character mentioned, the upper mold section usually is soaped or otherwise lubricated so as to assure that the tire will remain in the lower mold section when the upper mold section is lifted therefrom, as the molds and tires move along a continuous conveyor, and the apparatus constituting the subject matter of the present invention is associated with said conveyor and operates upon the successive tires as they move therealong.

The chief objects of the invention are to avoid damage to tire casings arising from extreme distortion or transverse bending of the tires while stripping them from their mold sections by mechanical means; and to provide a simple and efficient method and apparatus for breaking the adhesion of the tires and mold sections throughout a substantial area of their contacting surfaces. Other objects will be manifest.

Figure 1:
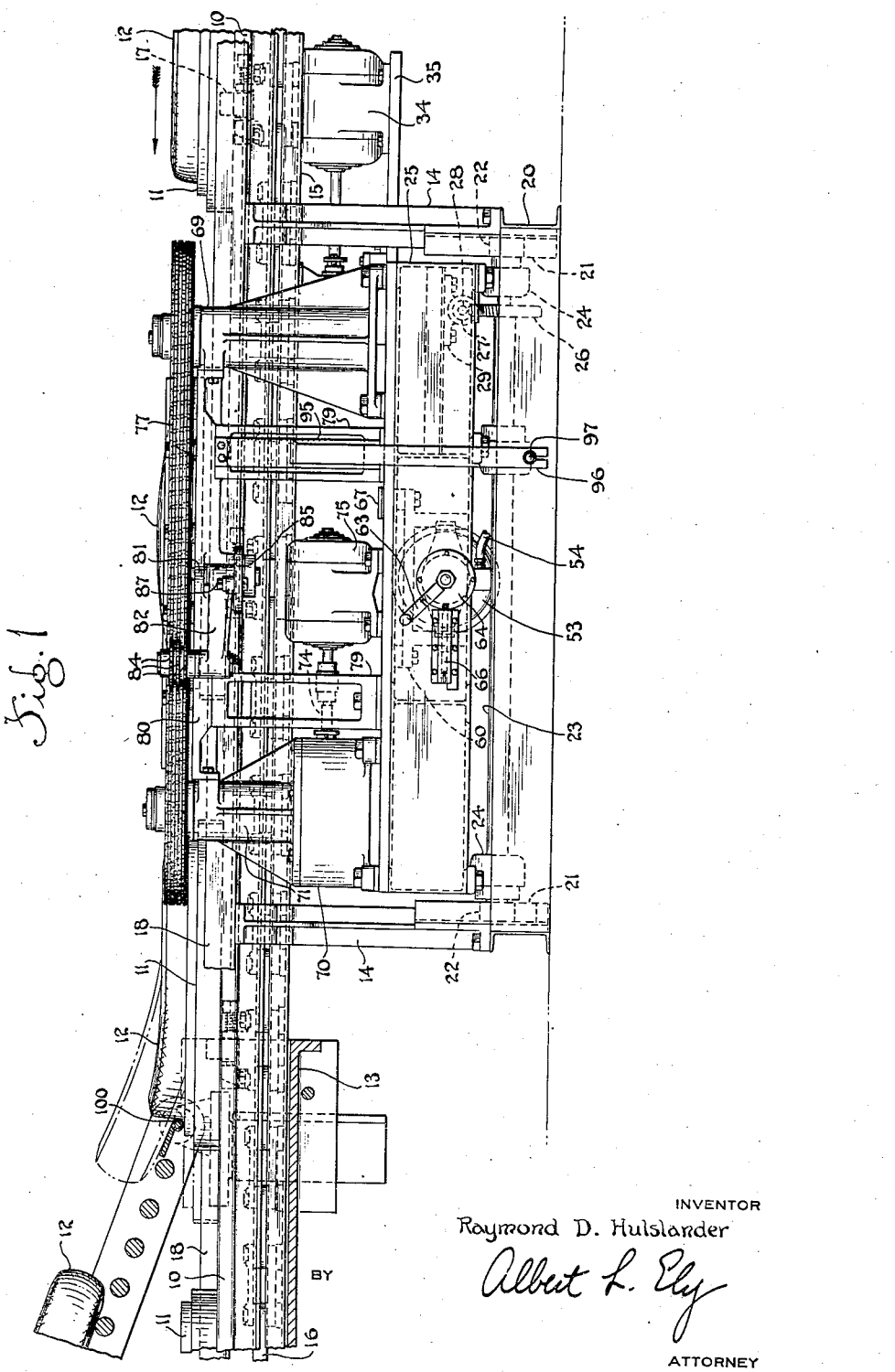
Figure 1 is a front elevation of apparatus embodying and adapted to carry out the invention, in its preferred form, and the work therein, and a continuous conveyor for moving the work relatively of said apparatus.
Figure 2:
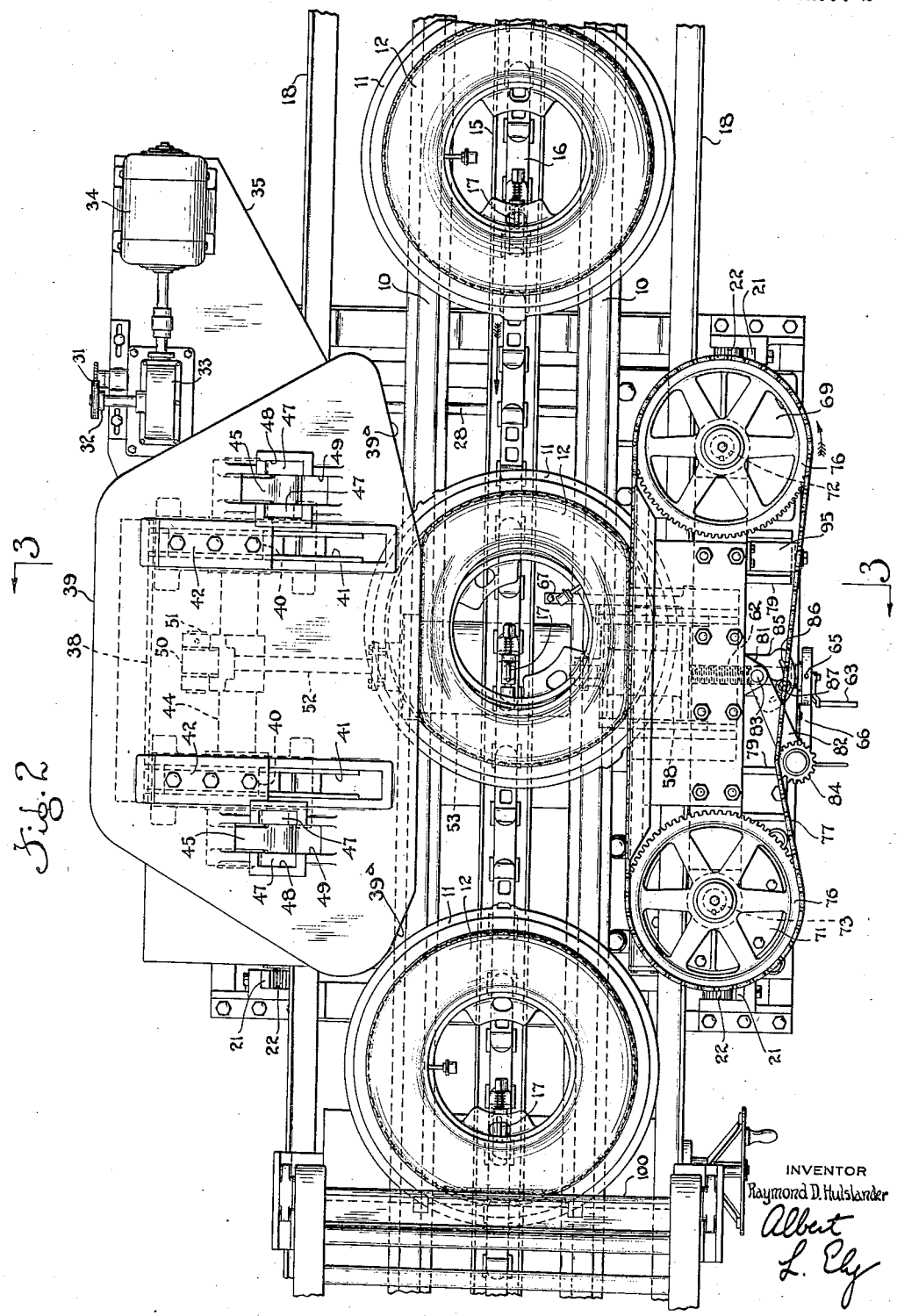
Figure 2 is a plan view of the apparatus shown in Figure 1.

Referring to the drawings, 10, 10 are a pair of rails constituting a part of a continuous conveyor, said rails being adapted to support mold sections with tires therein as said mold sections are moved longitudinally of said rails in the direction indicated by the arrows in Figures 1 and 2. A succession of mold sections and tires are shown upon the rails 10, the molds being designated 11 and the tires therein designated 12. At points removed from the tire-loosening apparatus the rails 10 are supported upon any suitable framework, such as that shown at 13, Figure 1. In the region of the tire-loosening apparatus the rails 10 are supported upon a pair of longitudinally spaced apart supporting legs 14, 14 that are mounted upon said apparatus as presently will be explained. The framework 13 and legs 14 also support a channel 15 that is disposed parallel to the rails 10, between and a little below the latter, and said channel 15 supports an endless driven chain 16 that is provided at spaced points with upstanding fingers 17, 17 adapted to engage the inner peripheral faces of successive mold sections 11 for propelling them along the rails 10. The framework 13 and legs 14 also carry guard rails 18, 18 at each side of the course of the mold sections 11 on the rails 10.

Figure 4:
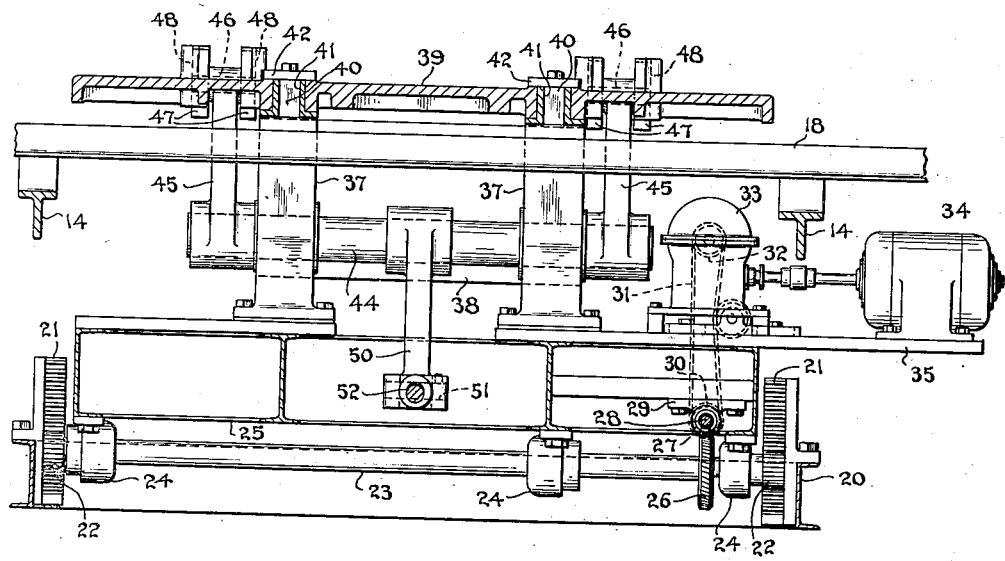
Figure 4 is a section on the line 4—4 of Figure 3.
Figure 5:
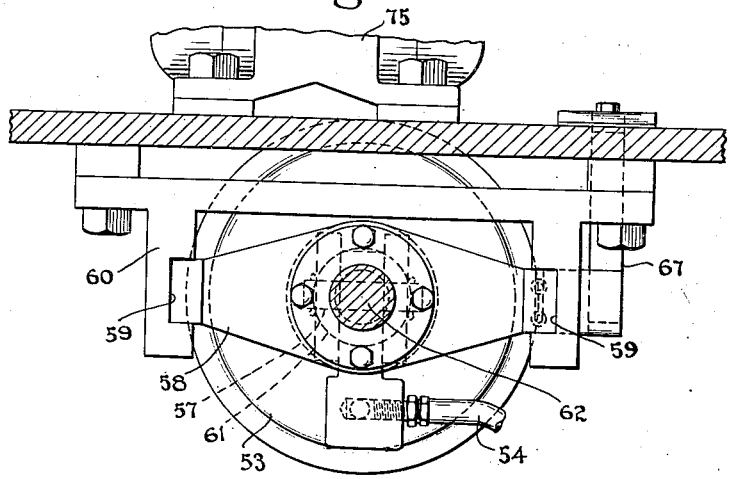
Figure 5 is a section on the line 5—5 of Figure 3.

The tire-loosening apparatus comprises a fixedly-positioned, rectangular base frame 20 that rests upon the floor below the rails 10 and supports the legs 14 at its opposite ends. Secured to the four corners of the base frame 19, and rising therefrom, are respective racks 21, 21, and meshed with said racks are respective gears 22, 22. The latter are mounted upon a pair of parallel shafts 23, 23, one at each end thereof, which shafts are disposed parallel to the rails 10. The shafts 23 are journaled in bearing brackets 24, 24 mounted upon the under side of a rectangular open framework 25, the said shafts constituting a support for said framework. The latter is arranged to be raised and lowered, and to this end each shaft 23 is provided with a worm wheel, such as the worm wheel 26, Figures 1 and 4, which worm wheels are meshed with respective worms 27 that are mounted adjacent the opposite ends of a shaft 28 that extends transversely of the framework 25 and is journaled in bearing brackets 29 carried thereby. The shaft 28 carries a sprocket 30 connected by a sprocket chain 31 with a sprocket 32 of a reduction gear device 33, the latter being driven by a motor 34, said reduction gear device and motor being mounted upon a plate 35 that is carried by the framework 25 and projects rearwardly therefrom. The motor 34 is driven, upon occasion, when it is desired to raise or lower the framework 25.

Rising from the framework 25, at the rear thereof, are spaced-apart pedestals 37, 37 that are connected to each other and braced by a web 38. Slidably mounted upon the top of pedestals 37, for fore and aft movement transversely with relation to the course of the tires 12, is a platen 39. Said platen is guided by a pair of tenons 40, 40 that project upwardly from the top of the respective pedestals 37 and extend through respective parallel slots or guideways 41 formed in the platen. Cap-plates 42 on the tops of the tenons secure the platen firmly in place on the pedestals. The slots 41 are of such length as to permit substantial fore and aft movement of the platen, and in the forward position of the platen the front margin thereof extends into the path of movement of the tires 12 and constitutes an abutment against which the tires impinge and are deformed as they move longitudinally thereof. The said front margin of the platen has its end portions obliquely disposed with relation to its medial region, as shown at 39a, 39a, Figure 2, to facilitate engagement of the work with the platen.

For moving the platen 39 forward and backward to determinate operative and inoperative positions respectively, a rock-shaft 44 is journaled in the pedestals 37 below said platen. Secured to the opposite end portions of rock shaft 44 are respective upwardly extending rocker arms 45, 45, and the free upper end of each rocker arm is pivotally connected at 46 to a pair of slide blocks 47, 47 that are slidably mounted in respective vertical slideways 48, 48 formed on each side of an aperture 49 in the platen 39. For effecting angular or oscillating movement of the rock shaft 44, a downwardly extending lever arm 50 is centrally mounted thereon, the free end of said lever arm being pivotally connected at 51 to the outer end of the piston rod 52 of a double-acting fluid pressure-operated cylinder 53. Fluid pressure is conducted to opposite ends of the cylinder 53 through flexible inlet-and-outlet pipes 54, 55 that extend to a suitable source of pressure fluid (not shown).

The arrangement requires a modicum of oscillation of the cylinder 53, and to this end said cylinder is pivotally mounted at its rear end, at 57, upon one end of a horizontally movable slide 58 that is slidably mounted in a pair of suitable slideways 59, 59 formed in a bracket 60, the latter being secured to the framework 25. The slide 58 is formed with an axial bore in the rear end of which is mounted a nut 61, and threaded through said nut is one end portion of a screw 62 that is journaled adjacent its opposite end in framework 25. Said screw extends through said framework and has its end portion provided with a hand crank 63 by which it may be turned, and with a disc 64 that is provided with a plurality of radially disposed bores or recesses 65, 65. A latch or slide-bolt 66 is mounted upon the front face of framework 25 and is selectively insertable in said recesses 65 to hold the screw 62 fixedly in desired position. The arrangement is such that by adjusting the position of the cylinder 53 axially, adjustment of the forward, operative position of the platen 39 may be effected, thus adapting the apparatus for operation upon tires of various diameters. Secured to the front end of the slide 58 is an indicator or pointer 67 that is angularly formed so as to overlie a portion of the top face of framework 25, and suitable indicia may be placed on the latter, in the region over which the pointer moves, so that the position of the platen 39 may be determined by reference thereto.

Mounted upon the framework 25, at one end thereof and at its front margin, is an upstanding journal bracket 69, and similarly positioned at the opposite end of the framework is a housing 70 upon the top of which is mounted an upstanding journal bracket 71. Journaled in brackets 69, 71 are respective vertical shafts 72, 73, Figure 2, and within housing 70 is a reduction gear device (not shown) through which shaft 73 is driven, said device having a shaft 74, Figure 1, that is coupled to a motor 75 whereby said reduction gear device may be driven to drive shaft 73. At their upper ends each of the shafts 72 and 73 carries a plurality of sprockets 76, 76, herein shown as three in number, which sprockets are slightly axially spaced apart. The sprockets on one shaft are disposed in the same planes as the respective sprockets on the other shaft, and the sprockets on one shaft are connected with those on the other shaft by respective sprocket chains 77, 77, which chains have one of their reaches disposed in the path of the work, on the side thereof opposite the platen 39.

Mounted upon the framework 25, between journal brackets 69, 71 are spaced-apart pedestals 79, 79 which support a horizontal beam 80, the latter being secured to the tops of said pedestals, and having its ends secured to said journal brackets 69, 71 for the purpose of imparting lateral rigidity thereto. On its front margin the beam 80 is formed with spaced-apart ears 81, 81 between which an angularly adjustable arm 82 is pivotally mounted upon a hinge pin 83. The free end of arm 82 carries three idler sprockets 84, 84 which may be engaged with the respective sprocket chains 77 for the purpose of keeping the latter in taut condition. For securing the arm 82 in adjusted position, a plate 85 is mounted upon the lower ear 81, between the latter and the hub of arm 82, which plate is formed with an arcuate slot 86 concentric with hinge pin 83. A bolt 87 extending through said slot and through a laterally projecting ear 88 on arm 82 holds said arm securely in desired angular position.

Mounted atop of the beam 80 is a table-like guide-bar support 90, and an elongate, horizontal guide-bar 91 is mounted upon the rear margin of said support 90, said guide-bar having a tongue and groove connection with said support. The rear marginal face of the guide-bar has a wear-plate 92 attached thereto, and the rear face of said wear-plate is formed with three parallel, longitudinally-extending grooves, indicated at 93, Figure 2, in which grooves the rear reach of the endless chains 76 are disposed. The grooves 93 are relatively shallow so that the chains project laterally therefrom and are thereby enabled to engage the work as presently will be explained.

Permanently secured to the front of one of the pedestals 79 is a plate 95 that may be suitably calibrated along its front face. Partly overlying plate 95 is an indicator plate 96 that is adjustably secured at 97 to the stationary base frame. Plates 95, 96 move relatively of each other when the framework 25 is raised or lowered, so that the position of said framework readily may be determined by observing at what point on the calibrated plate the upper end of the plate 96 rests. By means of the motor 34 the framework 25 may be vertically adjusted so that chains 77 may engage work of different heights, or the framework may be raised to such height that the said chains are above the plane of the work and are therefore inoperative.

In the operation of the apparatus described, the chain 16 is constantly driven, the motor 75 is constantly driven so as to propel chains 77 in the direction such that the reach of the chains nearest chain 16 moves in the same direction as the latter, but at greater speed. In practice it has been found that a speed of 44 feet a minute for the chain 16 and 104 feet a minute for chains 77 has given satisfactory results. The work, consisting of lower mold sections 11 with respective tires 12 therein is mounted upon the rails 10 at a point removed from the loosening apparatus, to the right thereof as viewed in Figures 1 and 2. The molds placed upon the rails 10 are engaged on their inner peripheries by the upstanding fingers 17 of the moving chain 16 whereby said molds are propelled in succession along said rails 10, through the loosening apparatus. The fingers 17 of chain 16 are of such height that they engage the molds below the lugs that project inwardly from the inner peripheries of the molds, thereby permitting angular movement of the molds, relatively of the fingers 17, as will be explained.

Figure 3:
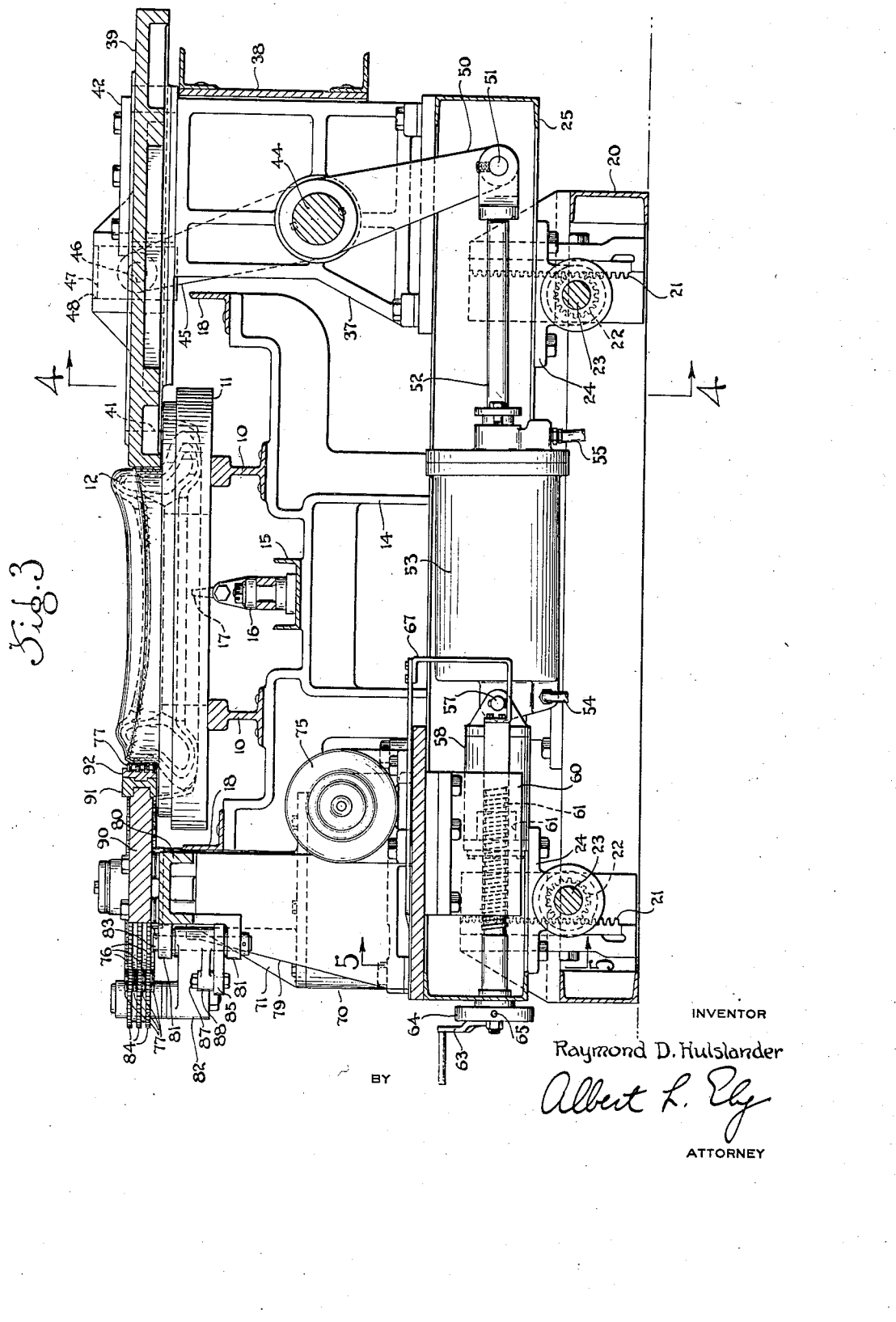
Figure 3 is a section on the line 3—3 of Figure 2.

As the molds 11 move along rails 10, the tires 12 projecting above the tops of said molds enter a region of restricted width defined on one side by the front margin of the platen 39 and on the other side by the chains 77, said region being of substantially less width than the diameter of said tires. The arrangement is such that the outer periphery of each tire is engaged substantially tangentially at diametrically opposite regions by said platen and chains, with the result that said regions are deformed and forced radially inwardly, as shown in Figures 2 and 3, the tread portion and a part of the lower sidewall of the tire being thus forced away from the cavity wall of the mold.

Because the platen 39 is stationary and because the chains 77 are driven at greater speed than the chain 16, an angular or rotary movement is imparted to the work unit engaged thereby, about the axis of said unit, and concurrently the unit is moved along its course at greater speed than that of the chain 16, with the result that the mold section 11 moves forwardly out of engagement with its chain finger 17, as is shown by the middle work unit in Figure 2, and there is no friction between said finger and mold section as the latter turns angularly on its axis. Angular movement of the work unit brings the periphery of the tire 12 progressively into contact with the platen 39 and chains 77 whereby the tire is progressively deformed and separated from its mold completely about its entire circumference. The length of the work-engaging portions of the platen 39 and chains 77 is such that the work makes substantially a complete revolution by reason of its engagement therewith. This completes the operation of the loosening apparatus upon the work. The operation is continuous and successive work units pass therethrough and are treated thereby without the assistance or attention of any human agency.

The apparatus usually has its delivery end positioned adjacent suitable mechanism for removing tires from molds. Such a mechanism is shown herein in Figures 1 and 2, the same comprising a rotatable bar 100 that extends transversely of the course of the work, in position to engage the leading face of a tire moving along said course. Said bar preferably is star-shaped in section, and rotates in the proper direction to force the tire upwardly, out of the mold. This is accomplished without excessive distortion of the tire because of the fact that the tire previously has been loosened from the major portion of the molding surface of the mold. A suitable conveyor 101 is provided for carrying away the tires 12 after their removal from their molds 11.

What is claimed is:

1. The method of loosening deformable annular articles in molds which comprises feeding a work unit, consisting of article and mold, in a course that has a region of narrower width than the diameter of the article, whereby the article is deformed in opposed regions of its structure in passing therethrough, and rotating the work unit on its axis as it passes through said narrow region.

2. The method of loosening deformable annular articles from molds which comprises forcing the article, while in the mold, against an immovable structure so as locally to deform the article and force it away from the mold, and rolling the article longitudinally of said structure whereby the article is progressively deformed circumferentially.

3. The method of loosening deformable annular articles in molds which comprises feeding a work unit, consisting of an article and mold, in its own plane, in a determinate course, which forces the article, substantially tangentially, against an immovable abutment projecting into said course, whereby the article is locally deformed, and then rotating the work unit on its own axis at a speed which results in increased speed of feed of the work unit whereby the article rolls longitudinally along said abutment and is progressively deformed circumferentially thereby.

4. In apparatus for loosening deformable articles from molds, the combination of means for conveying a work unit, consisting of article and mold, along a determinate course, and an elongate stationary abutment projecting into said course and disposed parallel thereto against which the article is forced as it moves along said course, to effect local deformation of said article.

5. In apparatus for loosening deformable articles from molds, the combination of means for conveying a work unit consisting of article and mold, along a determinate course, an elongate stationary abutment projecting into said course and extending longitudinally thereof against which the article is forced, to effect local deformation of the article, and means for effecting angular movement of the article so that the latter presents other regions of its surface to the abutment as it moves longitudinally thereof.

6. In apparatus for loosening deformable annular articles from molds, the combination of means for conveying a work unit, consisting of article and mold, along a determinate course, an elongate stationary abutment projecting into said course in parallelism therewith adapted to engage the article substantially tangentially as it moves along said course and locally to deform said article, and means for rotating the work unit on its axis so that its peripheral surface is progressively brought into engagement with said abutment and deformed thereby.

7. In apparatus for loosening deformable annular articles from molds, the combination of a traveling conveyor adapted to move a mold unit, consisting of an article and mold, along a determinate course, an elongate stationary abutment projecting into said course in parallelism therewith adapted to engage the article substantially tangentially as it moves along said course and locally to deform said article in a radial direction, and means for rotating the work unit on its axis at such speed that it rolls along said abutment at greater speed than the speed of the conveyor, and is progressively deformed by said abutment throughout the circumference.

8. In apparatus for loosening deformable annular articles from molds, the combination of means for advancing a work unit, consisting of an article and mold, along a determinate course, means extending longitudinally of said course projecting into said course from opposite sides thereof adapted to engage the article as it passes therebetween, to deform the article in opposite regions thereof, one of said last-mentioned means being stationary and the other being movable, and means for moving the said movable means in the direction of movement of the work unit.

9. In apparatus for loosening deformable annular articles from molds, the combination of a traveling conveyor adapted to move a work unit, consisting of an article and a mold, along a determinate course, means projecting into said course from opposite sides thereof adapted to engage the article as it passes therebetween, to deform the article in opposite regions thereof, one of said means being an elongate stationary abutment and the other of said means being an endless driven member extending parallel to the course of the work, and means for driving said driven member at greater speed than the speed of said conveyor whereby the work is caused to roll over the stationary abutment and to advance at greater speed than said conveyor.

RAY. D. HULSLANDER.